United States Patent
Scherer et al.

(10) Patent No.: US 9,222,800 B1
(45) Date of Patent: Dec. 29, 2015

(54) TAXI INFORMATION PRESENTATION SYSTEM, DEVICE, AND METHOD

(75) Inventors: Christopher A. Scherer, Cedar Rapids, IA (US); Travis S. VanderKamp, Marion, IA (US); Felix B. Turcios, Cedar Rapids, IA (US); John W. Romine, III, Cedar Rapids, IA (US); Kenneth A. Zimmerman, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 491 days.

(21) Appl. No.: 13/567,663

(22) Filed: Aug. 6, 2012

(51) Int. Cl.
*G01C 23/00* (2006.01)

(52) U.S. Cl.
CPC ..................... *G01C 23/005* (2013.01)

(58) Field of Classification Search
None
See application file for complete search history.

(56) References Cited

U.S. PATENT DOCUMENTS

| | | | |
|---|---|---|---|
| 5,745,863 A * | 4/1998 | Uhlenhop | G01C 23/005 701/1 |
| 6,731,226 B2 | 5/2004 | Walter | |
| 7,382,288 B1 * | 6/2008 | Wilson et al. | 340/972 |
| 7,432,828 B2 * | 10/2008 | He | G01C 23/005 340/438 |
| 7,965,202 B1 | 6/2011 | Chiew et al. | |
| 7,974,773 B1 | 7/2011 | Krenz et al. | |
| 8,094,188 B1 | 1/2012 | Yum et al. | |
| 8,099,234 B1 | 1/2012 | Frank et al. | |
| 8,521,411 B2 | 8/2013 | Grabowski et al. | |
| 2003/0105580 A1 * | 6/2003 | Walter | 701/120 |
| 2003/0132860 A1 * | 7/2003 | Feyereisen | G01C 23/00 340/973 |
| 2003/0193505 A1 * | 10/2003 | Ribadeau Dumas | G06F 3/04815 345/473 |
| 2009/0005961 A1 * | 1/2009 | Grabowski et al. | 701/200 |

OTHER PUBLICATIONS

U.S. Appl. No. 12/462,969, filed Aug. 11, 2009, McCusker.

* cited by examiner

*Primary Examiner* — Ulka Chauhan
*Assistant Examiner* — Sultana M Zalalee
(74) *Attorney, Agent, or Firm* — Angel N. Gerdzhikov; Donna P. Suchy; Daniel M. Barbieri

(57) ABSTRACT

Present novel and non-trivial system, device, and method for presenting taxi information to a pilot are disclosed. A processor receives aircraft taxi information; retrieves navigation reference and object data; generates an image data set as a function of the aircraft taxi information data and the navigation reference and object data; and provides the image data set to a display system. The image data set could be representative of an image in which one or more first location highlighters highlight the location(s) of one or more raised surface features that appear within an egocentric, perspective scene outside the aircraft. The one raised surface feature could be comprised of a raised surface boundary or a raised surface centerline. In an additional embodiment, the image could include one or more second location highlighters highlighting the location(s) of one or more raised surface transition features.

21 Claims, 9 Drawing Sheets

TAXI INFORMATION PRESENTATION SYSTEM, DEVICE, AND METHOD

BACKGROUND OF THE INVENTION

1. Field of the Invention

This invention pertains generally to the field of aircraft displays that depict taxiway clearance information.

2. Description of the Related Art

A great deal of attention in the aviation industry has been paid to the avoidance of runway incursions. A runway incursion is an incident at an airport which adversely affects runway safety. Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

Inventors have addressed the issue of runway incursion. For example, Carrico et al addresses the issue of runway incursion in U.S. patent application Ser. No. 13/236,676 entitled "System, Apparatus, and Method for Generating Airport Surface Incursion Alert." In another example, Corcoran III addresses the issue of runway incursion in U.S. Pat. No. 6,606,563 entitled "Incursion Alerting System." In Corcoran III, a system is presented for alerting the occupant of a vehicle that the vehicle is approaching a zone of awareness, where the zone of awareness surrounds a runway and is based upon a reference such as a line or line segment that defines a runway centerline. When the vehicle is within a predetermined value of the zone of awareness, an alert is provided to the occupant. That is, a processor calculates the difference between the zone of awareness and the aircraft and initiates the alerting device if the distance is within predetermined parameters. The processor may also take into account the direction of travel and/or velocity when initiating the alert to adjust predetermined parameters by, for instance, increasing a fixed distance at which the alert is initiated if the vehicle is approaching the zone of awareness. Alternatively, the processor may adjust values corresponding to the location of the vehicle, location of the reference upon which the zone of awareness is based, or the distance between the vehicle location and reference location, according to the velocity, direction of travel, or both.

In another example, Roe et al discusses an on-ground Runway Awareness and Advisory System ("RAAS") in U.S. Pat. No. 7,587,278 entitled "Ground Operations and Advanced Runway Awareness and Advisory System." In Roe, the RAAS enhances situational awareness during taxiing by providing advisories to the pilot. The RAAS algorithm determines whether the aircraft will cross a runway or whether the aircraft is on the runway and provides applicable advisories. For landing and on-ground aircraft, the RAAS constructs an advisory annunciation envelope or bounding box from which situational awareness annunciations are announced. An Aural/Visual Advisory Processing function generates an advisory when a runway encounter is triggered when an aircraft enters the envelope surrounding the runway that could be augmented as a function of ground speed.

In another example, Krenz et al discusses a system for providing taxi navigation information to a pilot of an aircraft in U.S. Pat. No. 7,974,773 entitled "Methods and Devices of an Aircraft Taxi Navigation System." In Krenz, taxi navigation symbology representative of airport signs comprised of graphical objects are presented to the pilot in an egocentric manner or a "pilot's eye" view and not a "bird's eye" view such as reading a roadmap. There were several novel aspects therein including the use of ICAO taxiway and runway signage symbols depicted in an egocentric format on the primary cockpit indicator, the placement of symbologies of runway signage to indicate upcoming left and right turns and current airport surface, the use of distance indications adjacent to the symbologies, and display of a plurality of turns to the left and to the right.

Despite many improvements, situational awareness of the runway environment still remains a significant safety issue.

BRIEF SUMMARY OF THE INVENTION

The embodiments disclosed herein present novel and non-trivial system, device, and method for providing taxi information to a pilot of an aircraft. By improving the pilot's situational awareness with the embodiments disclosed herein, a reduction in the number of runway incursions should be realized.

In one embodiment, a system is disclosed for providing taxi information to a pilot of an aircraft. The system may be comprised of a source of taxi data, at least one source of navigation reference and object data, a processor for generating an image data set, and a display system.

In another embodiment, a device is disclosed for providing taxi information to a pilot of an aircraft, where such device could be the processor configured to generate the image data set based upon the source of taxi data and the navigation reference and object data. The image data set could be representative of an image in which one or more first location highlighters highlight the location(s) of one or more raised surface features that appear within an egocentric, perspective scene outside the aircraft. In one embodiment, a raised surface feature could be comprised of a raised surface boundary or a raised surface centerline. In an additional embodiment, the image could include one or more second location highlighters highlighting the location(s) of one or more raised surface transition features.

In another embodiment, a method is disclosed for providing taxi information to a pilot of an aircraft, where such method could be performed by the processor. When properly configured, the processor may receive aircraft taxi information data representative of at least the current position of the aircraft and a designated surface route comprised of one or more specified surfaces; retrieve navigation reference and object data corresponding to the aircraft taxi information data and representative of one or more specified surfaces; generate the image data set; and provide such image data set to the display system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
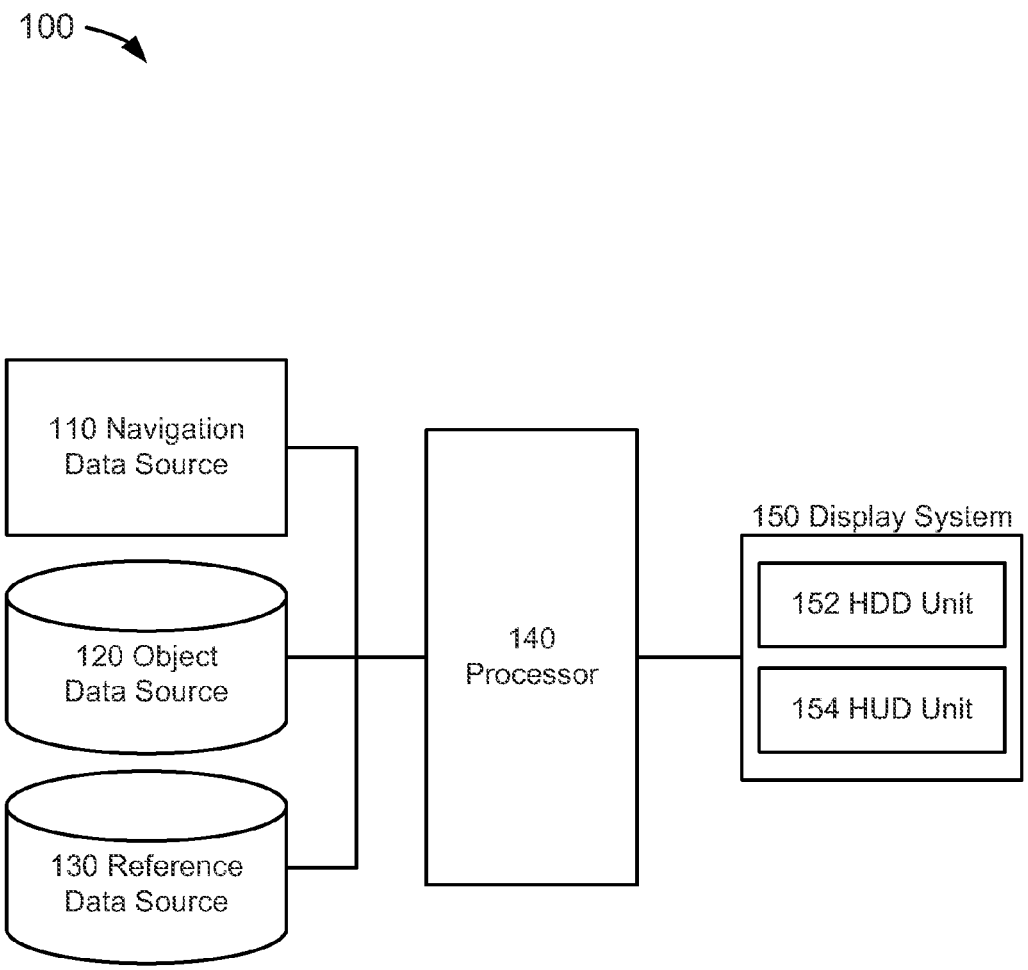
FIG. 1 depicts a block diagram of a system for presenting taxi information on an aircraft display unit.

FIG. 1 depicts a block diagram of an above-surface location highlighting presentation system 100 suitable for implementation of the techniques described herein. The highlighting presentation system 100 of an embodiment of FIG. 1 includes a navigation data source 110, an object data source 120, a reference data source 130, a processor 140, and a display system 150.

In an embodiment of FIG. 1, the navigation data source 110 could be comprised of a system or systems that provide navigation data information in an aircraft. As embodied herein, the navigation data could include taxi data representative of taxi information such as a route specified in a taxi clearance. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position 112, altitude 114, heading 116, and attitude 118. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the processor 140 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft and/or receiving and storing taxi route information comprised of one defined surface or a series of defined surfaces. The FMS may also allow for the modification of the taxi data.

In an embodiment of FIG. 1, the object data source 120 could be comprised one or more sources of object data that could be comprised of terrain data and/or surface feature data. The object data source 120 could be comprised of, but is not limited to, a terrain database configured to store terrain data contained in digital elevation models ("DEM"). Generally, the terrain data of a DEM are stored as grids, and each grid represents an area of terrain and is commonly referred to as a terrain cell. The object data source 120 could be a database configured to store data representative of surface features such as, but not limited to, obstacles, buildings, lakes and rivers, and paved or unpaved surfaces. The object data source 120 is a data source known to those skilled in the art.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

In an embodiment of FIG. 1, the reference data source 130 could be comprised of any source of reference point data. The reference data source 130 could be comprised of a flight navigation database that may be part of the FMS and/or a taxi navigation database. The flight navigation database may contain records which provide reference data such as, but not limited to, surface data for taxiways and runways.

It should be noted that there could be an overlap of data between the object data source 120 and the reference data source 130. As embodied herein, a manufacturer and/or end-user may use the data from either source when such overlap occurs.

The reference data source 130 could be comprised of a taxi navigation database for storing airport data representative of, in part, airport surfaces and airport visual aids. In addition, the reference data source 130 could be a database that could store location data representative of a plurality of surface locations that define at least one feature such as, but not limited to, surface edges and/or boundaries, surface centerlines, and/or surface hold-short lines. The taxi navigation database could comprise an aerodrome mapping database ("AMDB") as described in the following document published by RTCA, Incorporated: RTCA DO-272A entitled "User Requirements for Aerodrome Mapping Information." DO-272A provides for aerodrome surface mapping requirements for aeronautical uses particularly on-board aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB. As embodied herein, the reference data source 130 could provide reference point data to the processor 140 for subsequent processing as discussed herein.

In an embodiment of FIG. 1, the processor 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 140 could be a processor(s) used by or in conjunction with any other system of the aircraft including, but not limited to, the navigation data source 110, the object data source 120, the reference data source 130, the display system 150, or any combination thereof.

The processor 140 may be programmed or configured to receive as input data representative of information obtained from various systems and/or sources including, but not limited to, the navigation data source 110, the object data source 120, and the reference data source 130. As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 140 may be programmed or configured to execute one or both of the methods discussed in detail below. The processor 140 may be programmed or configured to provide output data to various systems and/or units including, but not limited to, the display system 150.

In the embodiment of FIG. 1, the display system 150 may receive image data from a processor 140. The display system 150 could include any unit that provides symbology of tactical flight information including, but not limited to, a Head-Down Display ("HDD") unit 152 and/or a Head-Up Display ("HUD") unit 154. As embodied herein, the disclosures may be applied to one or more portable devices including, but not limited to, laptop computer, smartphone, and/or tablets which employ a display unit.

The HDD unit 152 may present tactical information to the pilot or flight crew—information relevant to the instant or immediate control of the aircraft, whether the aircraft is in flight or on the ground. The HDD unit 152 is typically a unit mounted to an aircraft's flight instrument panel located in front of a pilot and below the windshield and the pilot's field of vision. The HDD unit 152 displays the same information found on a primary flight display ("PFD"), such as "basic T" information (i.e., airspeed, attitude, altitude, and heading). Although it provides the same information as that of a PFD, the HDD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HDD unit 152 is designed to provide flexible configurations which may be tailored to the desired configuration specified by a buyer or user of the aircraft. In an embodiment of FIG. 1, locations above surface features may be depicted in an image on the HDD unit 152 using location highlighters as disclosed herein.

The HUD unit 154 provides tactical information to the pilot or flight crew in the pilot's forward field of view through the windshield, eliminating transitions between head-down to head-up flying. Similar to the HDD unit 152, the HUD unit 154 may be tailored to the desired configuration specified by a buyer or user of the aircraft. As embodied herein, the HDD unit 152, the HUD unit 154, or any display unit could receive an image data set from the processor 140 for subsequent presentation.

Figure 2:
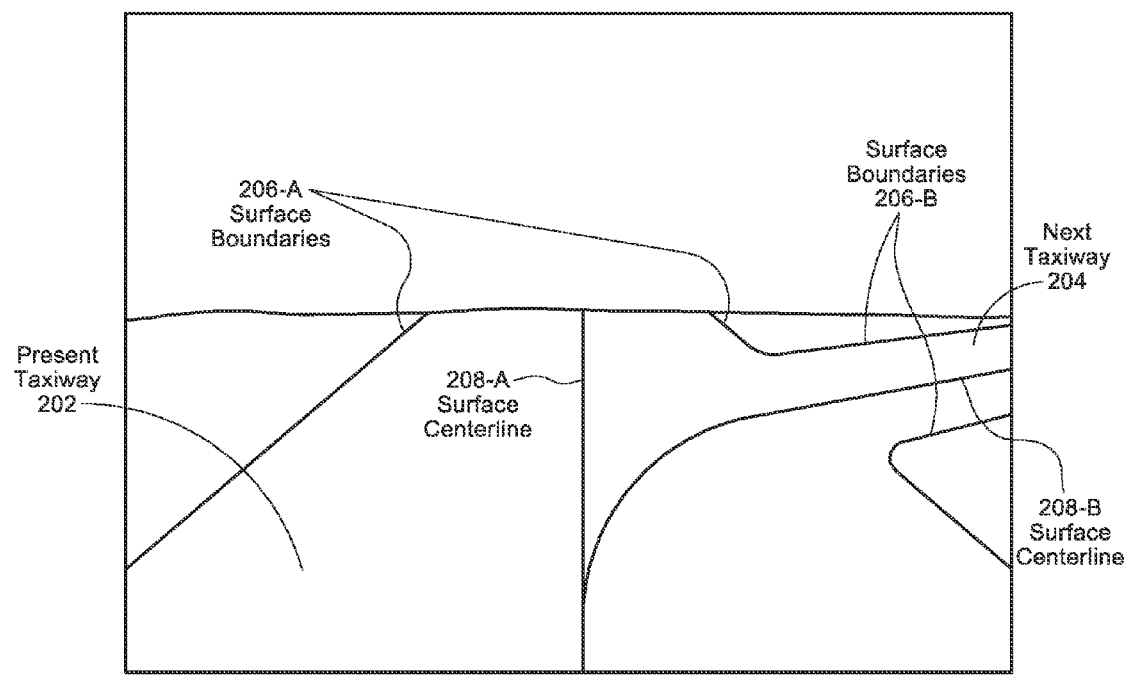
FIG. 2 depicts a present taxiway surface and a next taxiway surface.

Referring to FIG. 2, two intersecting taxiways are depicted on the HDD unit 152, a present taxiway 202 and a next taxiway 204. Each taxiway is comprised of surface boundaries 206 and surface centerlines 208. For the purpose of illustration and not of limitation, the depiction of FIG. 2 will be used in the discussion that follows.

The advantages and benefits of the embodiments discussed herein may be illustrated by showing example depictions of location highlighters used to present taxi instructions. In FIGS. 3A through 4E, examples are provided of how taxi information represented in taxi data could be presented on the HDD unit 152 through the use of location highlighters; the same taxi information may be presented on the HUD unit 154 using the embodiments disclosed herein.

Figure 3A:
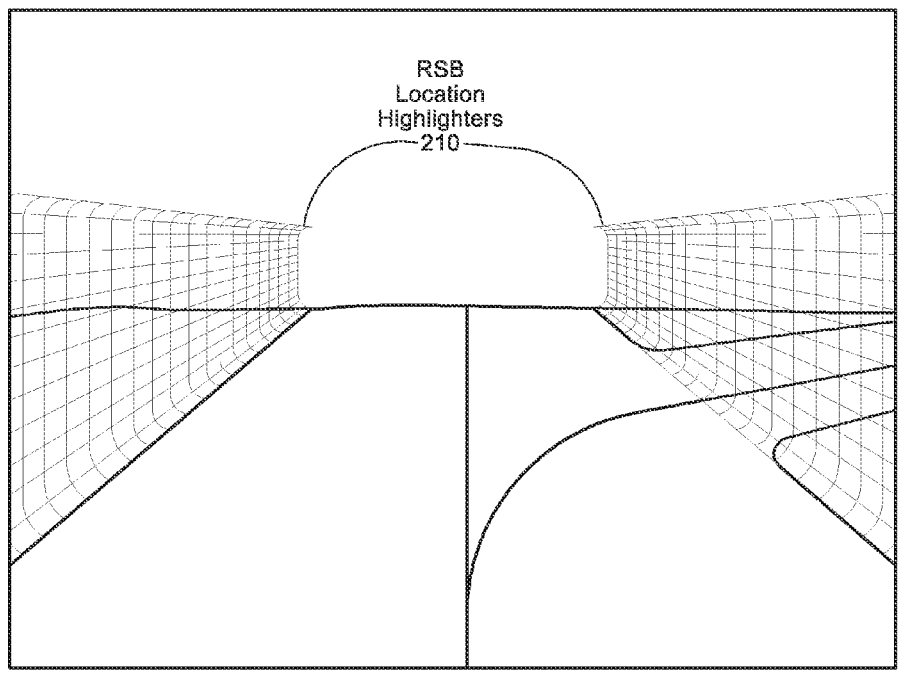
FIG. 3A depicts the present taxiway surface with raised surface boundaries.

In the example of FIG. 3A, it will be assumed that the taxi clearance includes the present taxiway 202; that is, the taxiway is a designated surface route. Locations above the boundaries or edges of a surface(s) (or "raised" boundaries or edges) may be depicted by a set of three-dimensional location highlighters located above from the surface, where each location highlighter may be comprised with a proximal end (i.e., the end nearest the surface), a distal end, and a body in between both ends that extends upwardly towards the distal end. As illustrated in FIG. 3A, the locations of raised surface boundaries are illustrated as fences (barriers, barricades, etc. . . . ), and location highlighters 210 highlighting the locations of raised surface boundaries (shown as "RSB" in the drawings) which could convey to the pilot that he or she will "crash into" or "pass through" a physical barrier if he or she fails to follow or strays away from the taxi route.

Figure 3B:
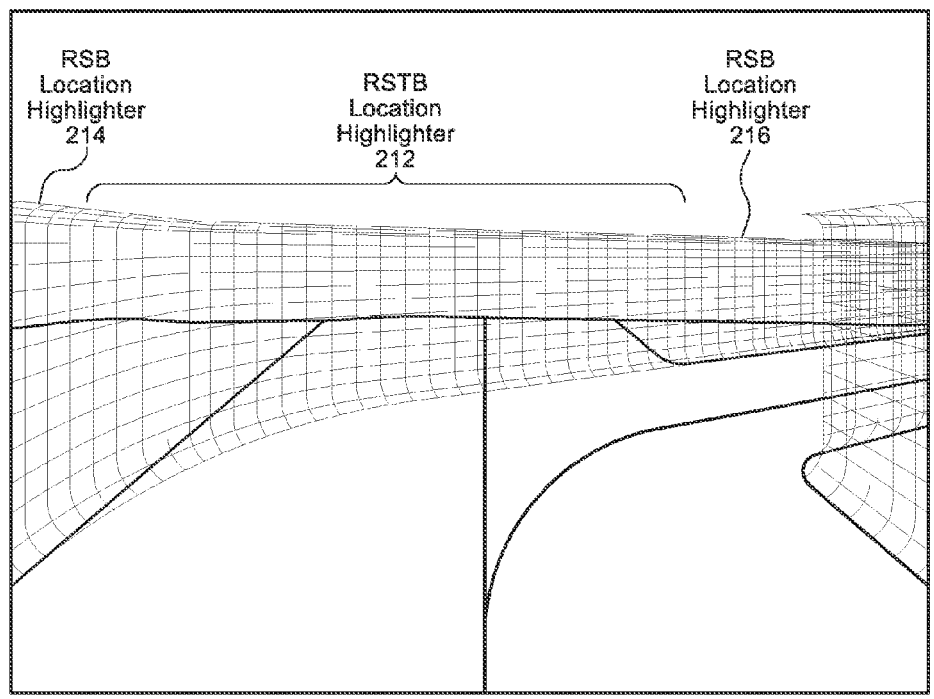
FIG. 3B depicts the present and next taxiway surfaces with raised surface boundaries including raised surface transition boundaries.

In the example of FIG. 3B, it will be assumed that the taxi clearance includes both the present taxiway and the next taxiway; that is, both taxiways are designated surface routes. As shown in FIG. 3B, where there is a change of route surfaces, the location highlighter is seen as curving to the right indicating to the pilot of the change of taxiway surfaces as stated in the taxi clearance. Where there is a transition from one designated surface to another, the processor 140 may be programmed to define location data of a transition boundary which connects the left boundary of the present taxiway with the left boundary of the next taxiway and the right boundary of the present taxiway with the right boundary of the next taxiway. Having defined the location of the transition boundaries, the processor 140 may then generate a location highlighter highlighting a location above a transition boundary, i.e., a raised surface transition boundary (own as "RSTB" in the drawings). As shown in FIG. 3B, location highlighter highlighting the raised surface transition boundary 212 is shown as smooth transitions between the raised surface boundaries 214 and 216 which is indicative of the processor 140 being programmed to define curved transition boundaries when there is a change of route surfaces.

Figure 3C:
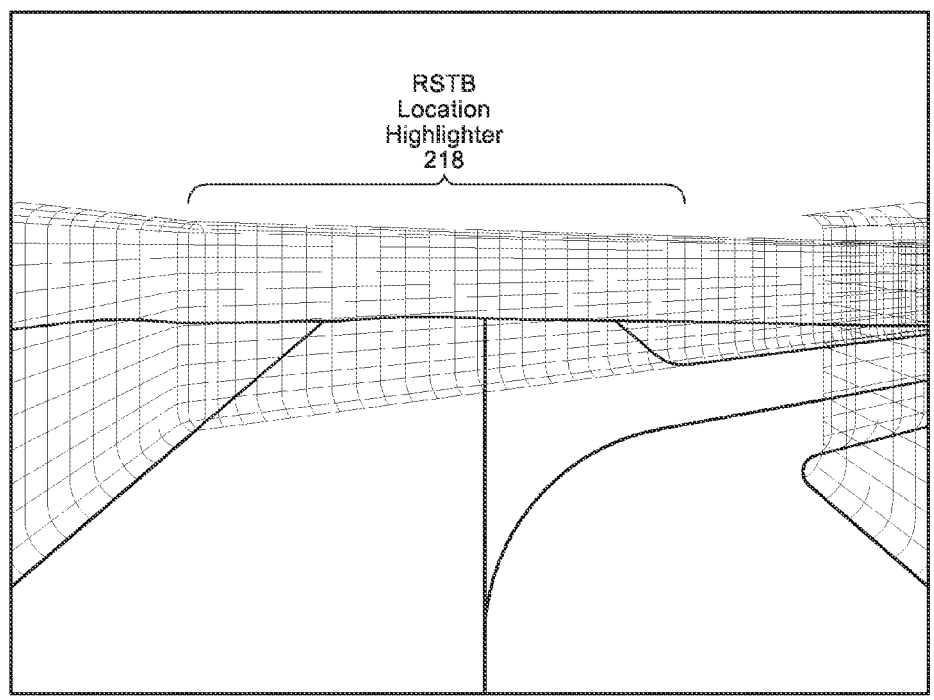
FIG. 3C depicts the present and next taxiway surfaces with raised surface boundaries including raised surface transition boundaries.

Instead of curved transition boundaries, the processor 140 may be programmed to define one or more straight transition boundaries. In the example of FIG. 3C, the location highlighter highlighting the left raised transition boundary 218 is not smooth but "squared off" which is indicative of a straight transition boundary.

Locations of raised surface boundaries depicted as physical objects may be enhanced. Although fences may be used, a plurality of highlighters is available or configurable to a manufacturer or end-user for enhancing the location of raised surface boundaries or edges, raised centerlines, and/or raised hold-short lines (as discussed below). Those skilled in the art will appreciate the ability and ease with which executable software code may be reprogrammed or modified by a manufacturer or end-user to facilitate a configuration of highlighting symbology selected by a manufacturer or end-user without affecting or expanding the scope of the embodiments discussed herein.

It should be noted that the use of highlighters for identifying locations has been disclosed by Chiew et al in U.S. Pat. No. 7,965,202 entitled "System, Module, and Method for Presenting an Abbreviated Pathway on an Aircraft Display Unit," by Yum et al in U.S. Pat. No. 8,094,188 entitled "System, Apparatus, and Method for Enhancing the Image Presented on an Aircraft Display Unit through Location Highlighters," and by Frank et al in U.S. Pat. No. 8,099,234 entitled "System, Apparatus, and Method for Generating Location Information on an Aircraft Display Unit Using Location Markers."

In the following paragraphs, other examples of criteria and performance factors are provided to illustrate the ability with which a manufacturer or end-user may define one or more highlighters as embodied herein. These illustrations are intended to provide examples of illuminating or highlighting symbology and are not intended to provide a limitation or an exhaustive list of the embodiments discussed herein.

Figure 3D:
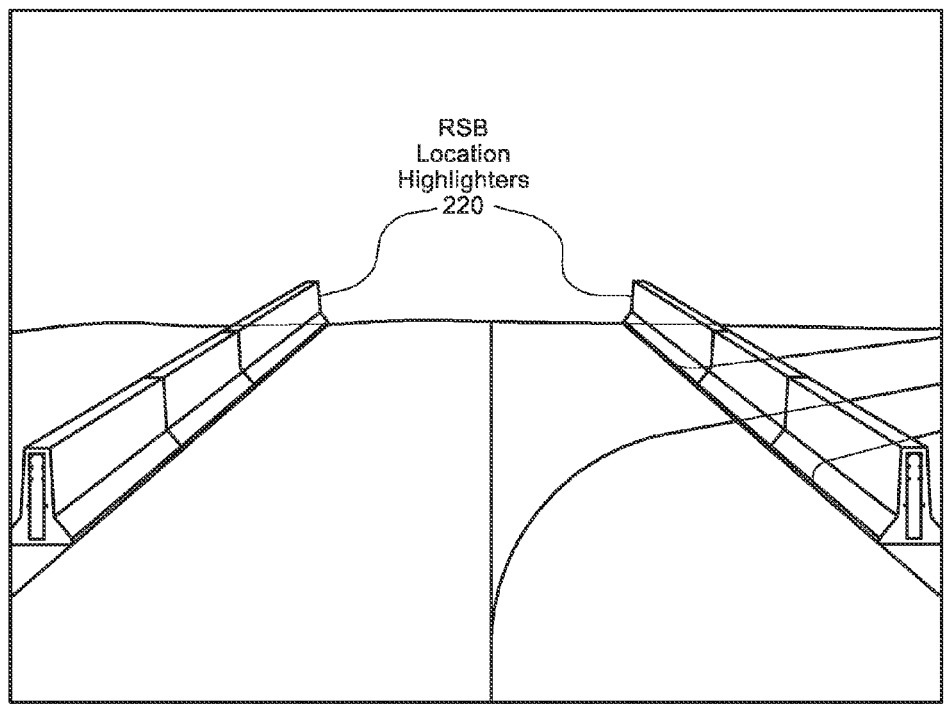
FIG. 3D depicts the present taxiway surface with raised surface boundaries.
Figure 3E:
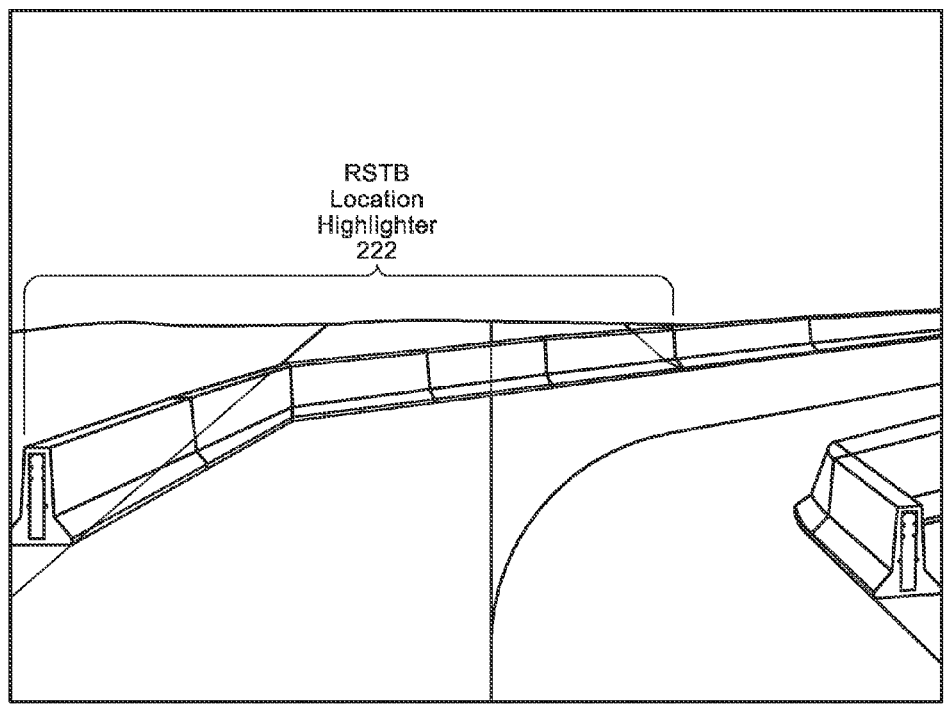
FIG. 3E depicts the present and next taxiway surfaces with raised surface boundaries including raised surface transition boundaries.
Figure 3F:
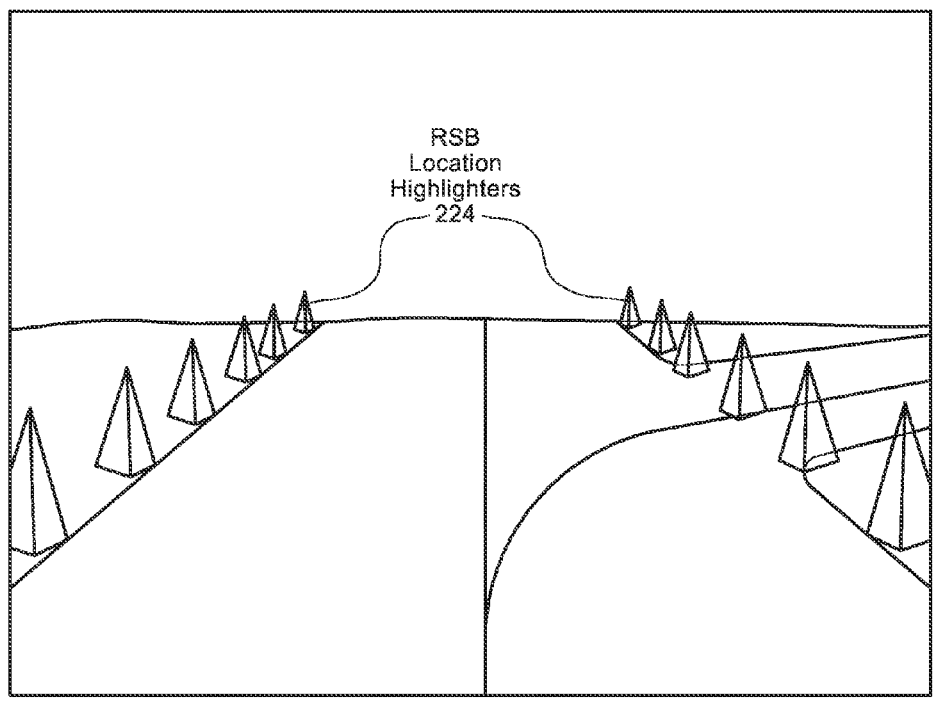
FIG. 3F depicts the present taxiway surface with raised surface boundaries.
Figure 3G:
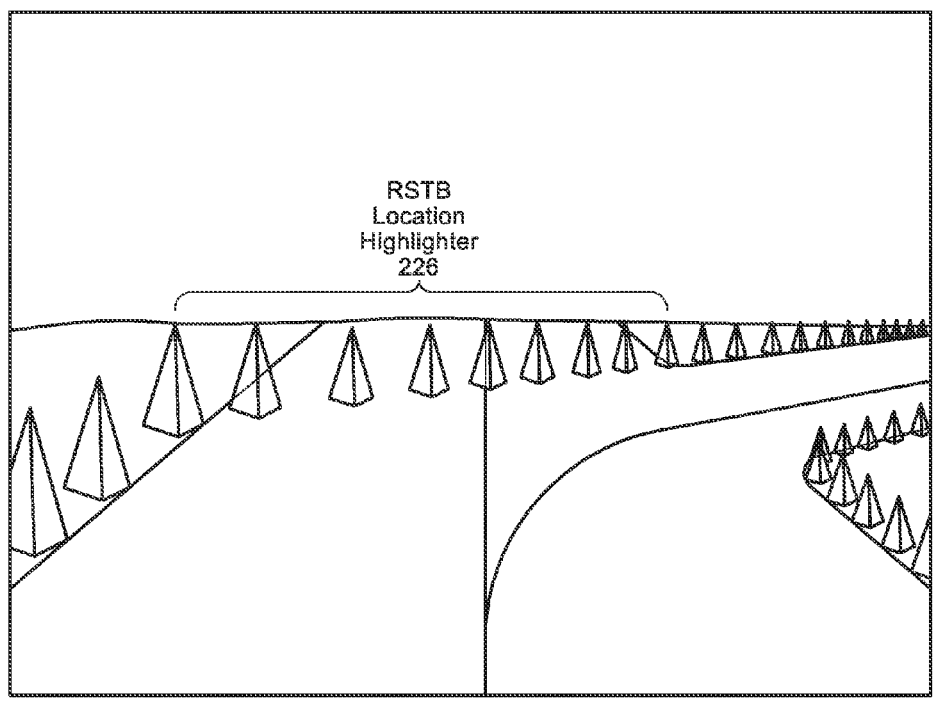
FIG. 3G depicts the present and next taxiway surfaces with raised surface boundaries including raised surface transition boundaries.
Figure 3H:
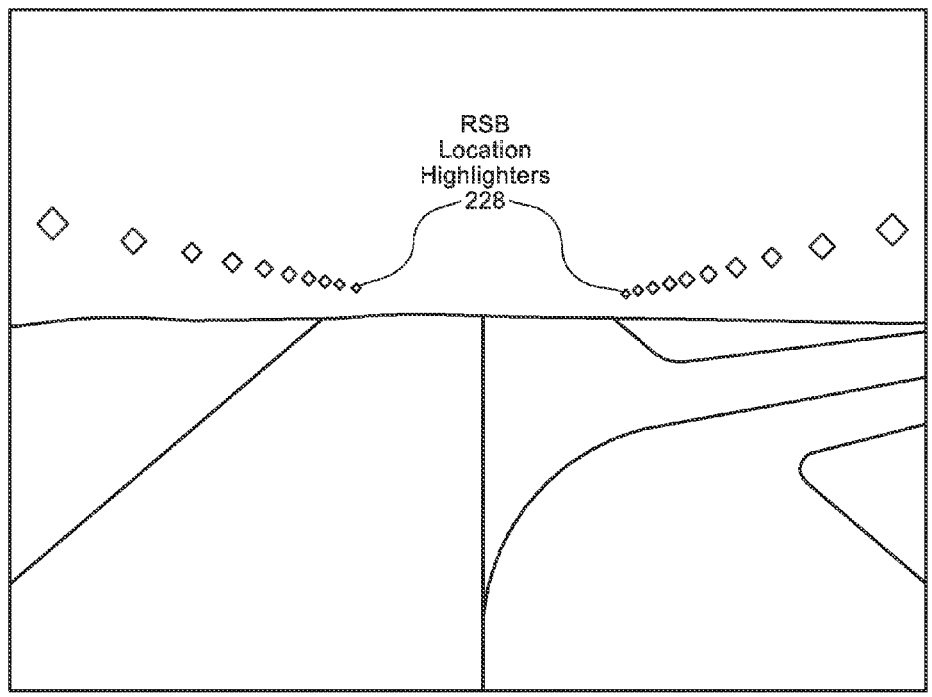
FIG. 3H depicts the present taxiway surface with raised surface boundaries.
Figure 3I:
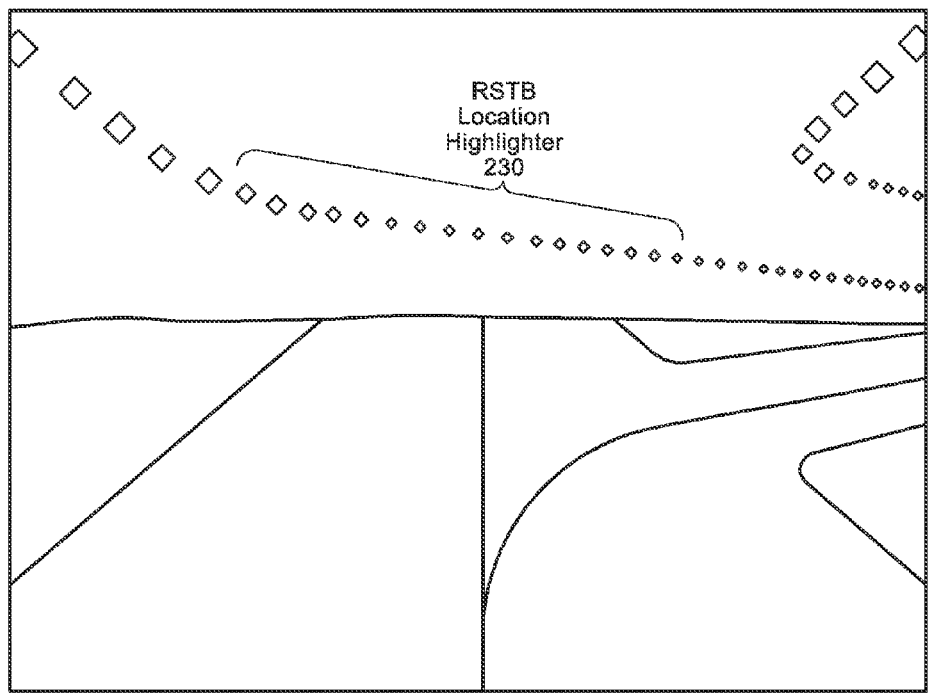
FIG. 3I depicts the present and next taxiway surfaces with raised surface boundaries including raised surface transition boundaries.

Location highlighters of raised surface boundaries are not limited to one continuous physical structure. In the examples of FIGS. 3D and 3E, the location highlighters of raised surface boundaries 220 and a raised surface transition boundary 222 are comprised of a series or sequence of "jersey barriers" corresponding to the taxi clearances of FIGS. 3A and 3B, respectively. In the examples of FIGS. 3F and 3G, the location highlighters of a raised surface boundaries 224 and a raised surface transition boundary 226 are comprised of a series or sequence of "orange cones" corresponding to the taxi clearances of FIGS. 3A and 3B, respectively. In the examples of FIGS. 3H and 3I, the location highlighters of raised surface boundaries 228 and a raised surface transition boundary 230 comprised of a series or sequence of "diamonds in the sky" corresponding to the taxi clearances of FIGS. 3A and 3B, respectively. If the pilot fails to follow or strays away from the taxi route represented in the taxi data, these location highlighters could visually convey a graphical message that the aircraft could "crash into" a jersey barrier or "pass through" a series of orange cones or "diamonds in the sky."

Figure 4A:
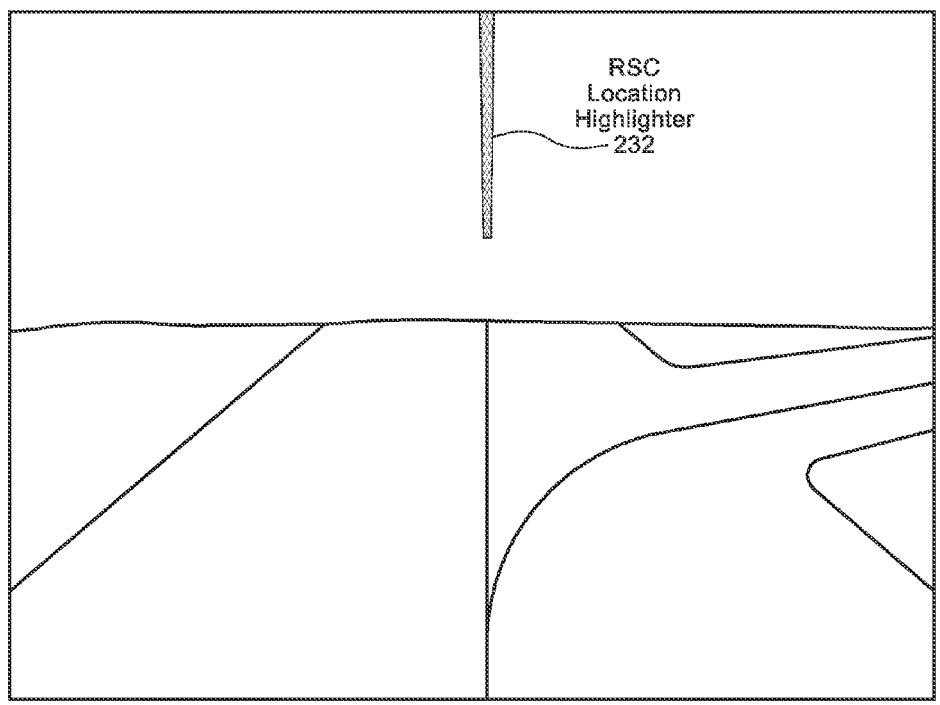
FIG. 4A depicts the present taxiway surface with a raised surface centerline.

Location highlighters are not limited to highlighting the locations of raised surface boundaries. As stated above, location highlighters may be used for highlighting the locations of raised centerlines. In the example of FIG. 4A, it will be assumed that the taxi clearance includes the present taxiway 202. Locations above the centerline(s) may be depicted by a two-dimensional or three-dimensional location highlighter located above from the surface, where each location highlighter may be comprised with a proximal end (i.e., the end closest to the aircraft), a distal end (i.e., the end closest to the horizon), and a body in between both ends. As illustrated in FIG. 4A, the locations of a raised centerline are illustrated as a "suspended cable," a location highlighter 232 highlighting the location of raised surface centerline (shown as "RSC" in the drawings) which could convey to the pilot that the physical object may "snap" if he or she fails to follow or strays away from the taxi route represented in the taxi data. Moreover, if the aircraft drifts away from the centerline, the physical object could stretch proportional to the amount of drift.

Figure 4B:
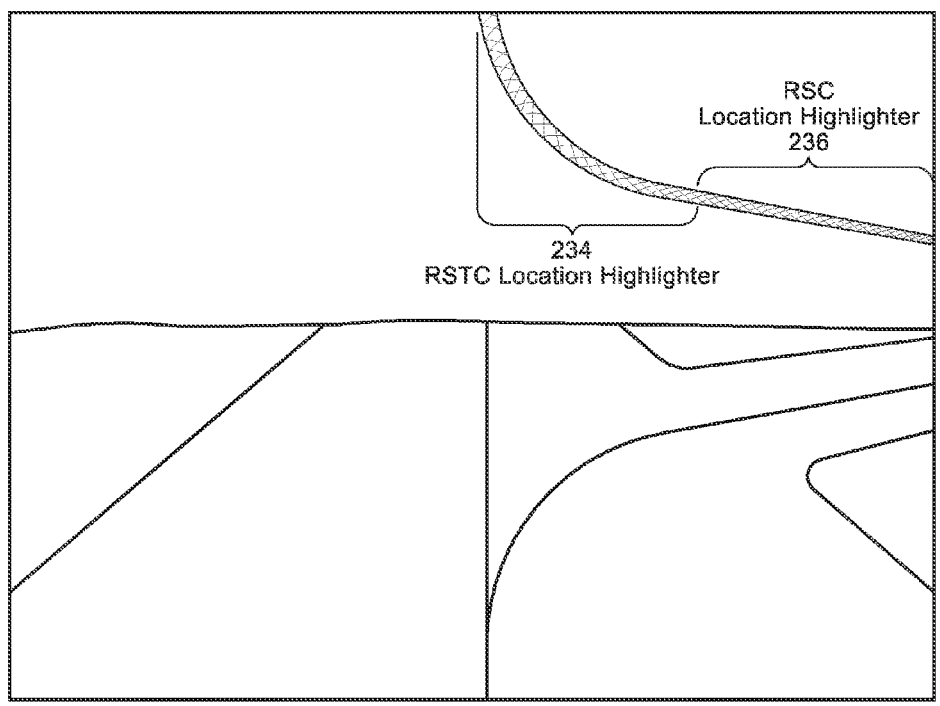
FIG. 4B depicts the present and next taxiway surfaces with raised surface centerlines including a raised surface transition centerline.

In the example of FIG. 4B, it will be assumed that the taxi clearance includes both the present taxiway and the next taxiway; that is, both taxiways are designated surface routes. As shown in FIG. 4B, where there is a change of route surfaces, the location highlighter is seen as curving to the right indicating to the pilot the change of taxiway surfaces as stated in the taxi clearance. Where there is a transition from one designated surface to another, the processor 140 may be programmed to define location data of a transition centerline which connects the centerline of the present taxiway with the centerline of the next taxiway. Having defined the location of the transition centerline, the processor 140 may then generate a location highlighter highlighting locations above the transition centerline 234, i.e., a raised surface transition centerline (shown as "RSTC" in the drawings). As shown in FIG. 4B, a location highlighter highlighting the raised surface transition centerline 234 is shown as a smooth transition which between one raised surface centerline (not shown) and another raised surface centerline 236 is indicative of the processor 140 being programmed to define a curved transition centerline when there is a change of route surfaces.

Figure 4C:
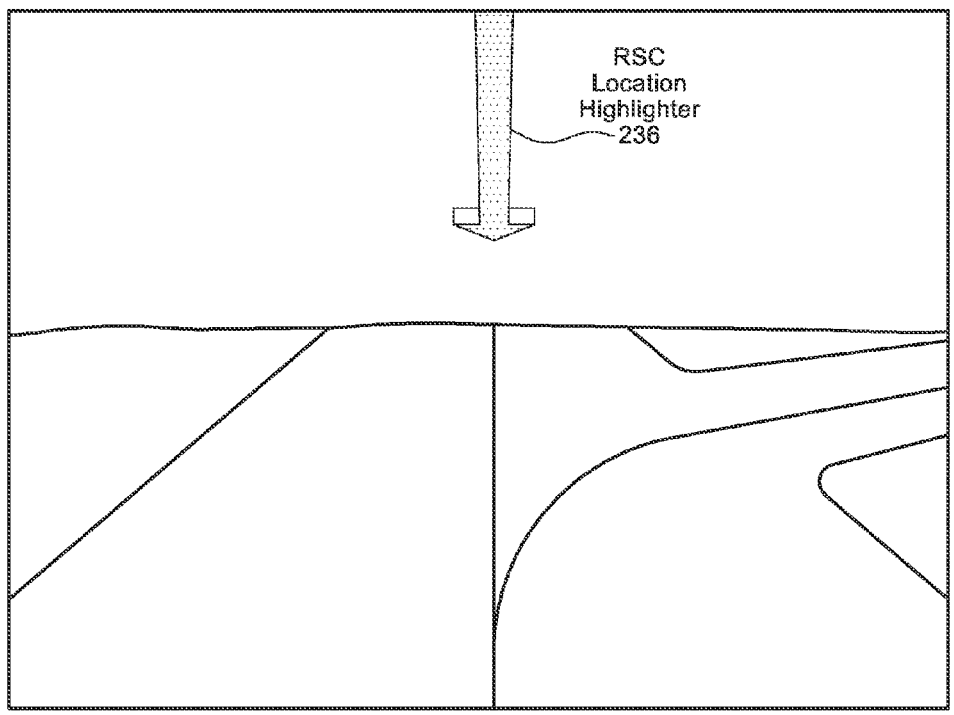
FIG. 4C depicts the present taxiway surface with a raised surface centerline.

Instead of a curved transition centerline, the processor 140 may be programmed to define a straight transition centerline. In the example of FIG. 4C, the location highlighter highlighting the raised transition centerline is not smooth but "squared off" which is indicative of a straight transition centerline.

Figure 4D:
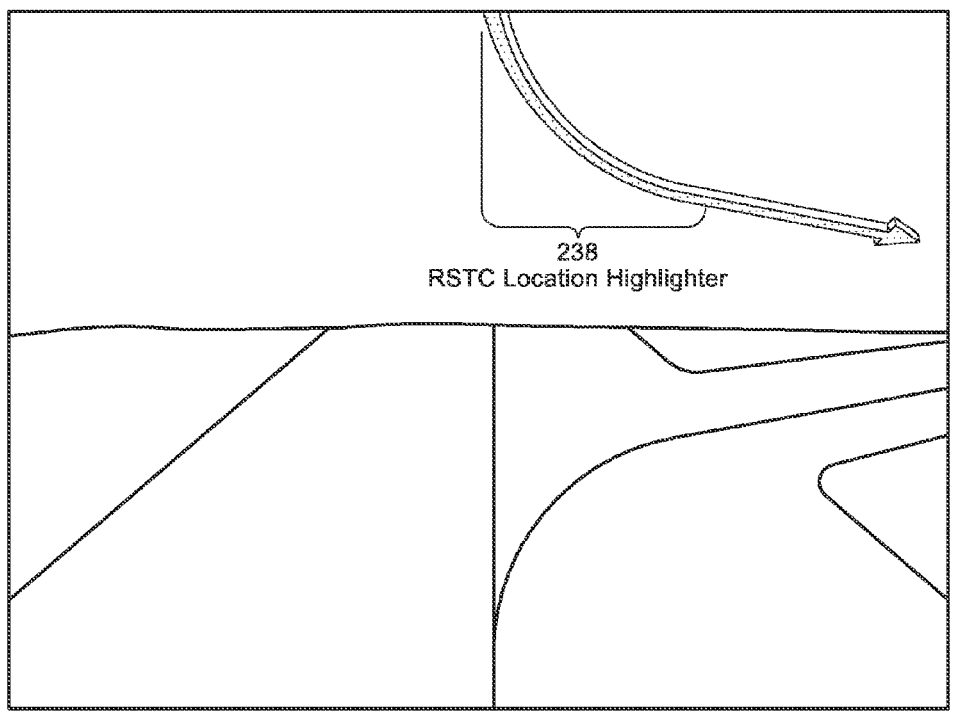
FIG. 4D depicts the present and next taxiway surfaces with raised surface centerlines including a raised surface transition centerline.

Location highlighters of raised centerline(s) are not limited to "suspended cable(s)." In the examples of FIGS. 4D and 4E, the location highlighters of a raised surface centerline 236 and a raised surface transition centerline 238 are comprised of three-dimensional arrows corresponding to the taxi clearances of FIGS. 3A and 3B, respectively. If the pilot fails to follow or strays away from centerline, the location highlighter(s) could visually convey a graphical message indicative of the drift from the centerline. This could be shown as a cable or arrow stretching proportionally with the amount of drift until it has reached a predetermined distance from the centerline at which point the location highlighter "snaps" just prior to exiting the surface of the designated route.

Location highlighters could include enhancing effects such as, but not limited to, shading, transparency, translucency, opacity, texture-mapping, bump-mapping, fogging, shadowing, patterns, colors, or any combination thereof. For example, dynamic transparency could be one of a plurality of enhancing effects for location highlighters, where a location highlighter could begin fading away as the raised surface boundaries or raised centerline as the distance from the aircraft increases, varying the level or degree of such enhancing effect as a function of distance. The utilization and employment of enhancing effects are known to those skilled in the art. An example illustrating the use of enhancing effects for enhancing surface features has been disclosed by McCusker in U.S. patent application Ser. No. 12/462,969 entitled "System, Module, and Method for Varying the Intensity of a Visual Aid Depicted on an Aircraft Display Unit."

On a display unit capable of displaying multiple colors, the location highlighter could be enhanced by color, and such color could depend on the distance between the raised surface boundaries or the raised centerlines and the aircraft, where each color could represent a range of proximity. For example, the location highlighter of a raised surface boundary could change to amber or yellow to warn the pilot of an approaching boundary and/or or change to red to warn the pilot if the boundary continues to approach. Similarly, the location highlighter of a raised centerline could stretch and change to amber or yellow to warn the pilot that the aircraft is drifting away from the centerline, continue to stretch while changing to red to warn the pilot of continuing drift, and "snaps" just prior to exiting the surface of the designated route. In another example, a location highlighter could remain steady or flash intermittently, where such flashing could depend on the distance between the raised surface boundaries or the raised centerlines and the aircraft, where such flashing could represent the range of proximity. These examples are intended to provide an example of enhancements which highlight the locations of the raised surface boundaries or the raised centerlines, and are not intended to provide a limitation or an exhaustive list to the embodiments discussed herein.

Figure 5:
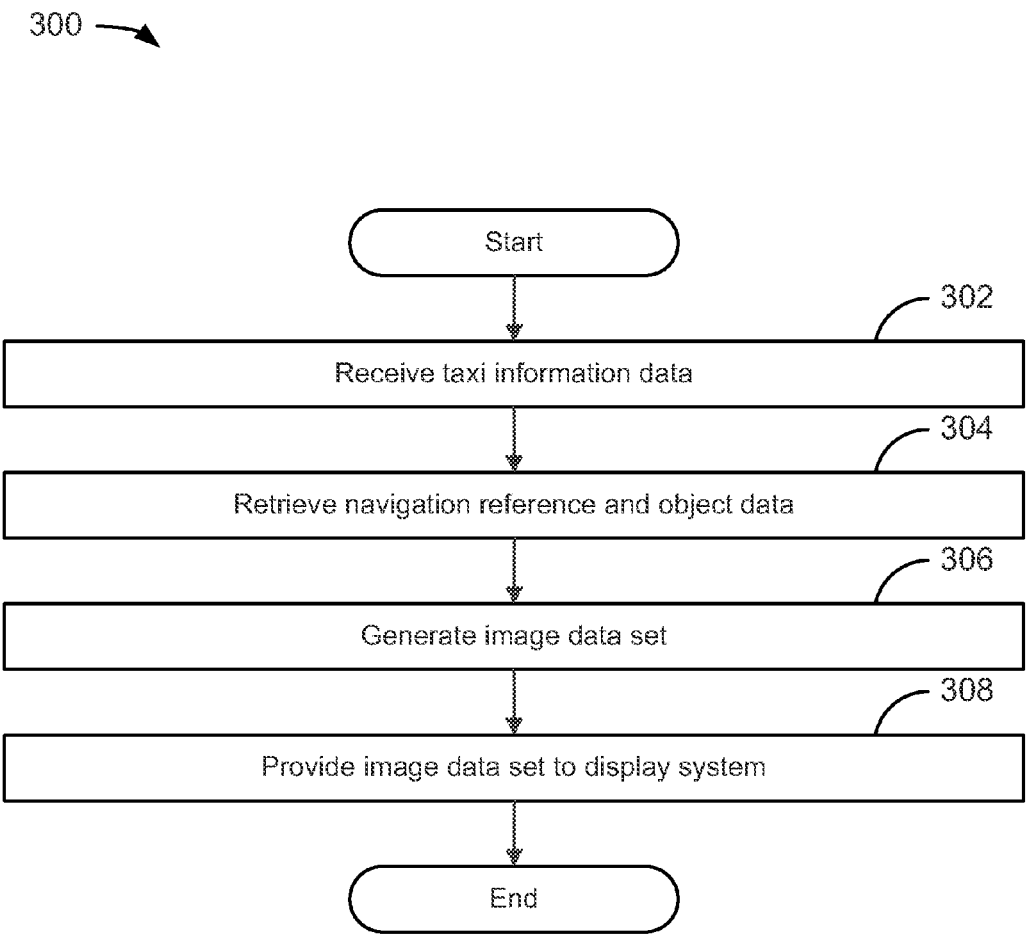
FIG. 5 provides a flowchart illustrating a method for presenting taxi information on an aircraft display unit.

FIG. 5 depicts flowchart 300 disclosing an example of a method for presenting taxi information to the pilot of an aircraft, where the processor 140 may be programmed or configured with instructions corresponding to the following modules embodied in flowchart 200. As embodied herein, the processor 140 may be a processor or a combination of processors found in the navigation data source 110, the object data source 120, the reference data source 130, the processor 140, and/or the display system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

The flowchart 300 begins with module 302 with the retrieving of aircraft taxi information data. Here, the taxi information data may be representative of at least the current position of the aircraft and a designated surface route.

The flowchart continues with module 304 with the retrieving of navigation reference and object data. Here, the retrieval of the navigation reference and object data could correspond to the current position of the aircraft and the designated surface route. In addition, the navigation reference and object data could be representative of one or more surfaces specified in the designated surface route. In one embodiment, the navigation reference and object data could include the locations of midpoints of two opposing ends of a surface. In another embodiment, the navigation reference and object data could include the locations of corner points of a surface or the locations of midpoints of two opposing ends of a surface plus surface width information.

In an additional embodiment, location data could be based upon the navigation reference and object data and representative of a plurality of surface locations that define at least one feature of at least one surface specified in the designated surface route. In one embodiment, the plurality of surface locations could be comprised of the locations of midpoints of two opposing ends of a surface used to define the surface feature comprised of a surface centerline. In another embodiment, the plurality of surface locations could be comprised of the locations of corner points of a surface or the locations of midpoints of two opposing ends of a surface plus surface width information, where each may be used to define the surface features comprised of surface edges or boundaries. In another embodiment, the location data could include transition location data representative of the locations which may define surface transition centerline(s) or surface transition boundaries, as applicable.

In an additional embodiment, location data representative of a plurality of surface locations that define at least one feature could be stored in a database such as, but not limited to, the navigation reference database 120.

The flowchart continues to module 306 with the generation of an image data set as a function of the aircraft taxi information data, the navigation reference and object data, and the location data. Here, the image data set could be representative of an image within which one or more location highlighters and one or more surfaces specified in the designation surface route appear within an egocentric, perspective scene outside the aircraft. In an embodiment in which a surface feature is comprised of a surface centerline, each location highlighter may highlight the location of a raised surface centerline comprised of locations above the surface centerline. In an embodiment in which a surface feature is comprised of a surface boundary, each location highlighter may highlight the location of a raised surface boundary comprised of locations above the surface boundary. In an embodiment in which a surface feature is comprised of a surface transition centerline, each location highlighter may highlight the location of a raised surface transition centerline comprised of locations above the surface transition centerline. In an embodiment in which a surface feature is comprised of a surface transition boundary, each location highlighter may highlight the location of a raised surface transition boundary comprised of locations above the surface transition boundary. As embodied herein, location highlighters corresponding to raised surface centerlines could be two-dimensional or three-dimensional, and three-dimensional for those corresponding to raised surface boundaries.

The flowchart continues to module 308 with the providing of an image data set to a display system, wherein the image represented in the image data set may be presented on one or more display units. As a result, one or more location highlighters may appear as being superimposed against the one or more surfaces specified in the designation surface route appear within an egocentric, perspective scene outside the aircraft. In one embodiment, a display unit could be comprised of the HDD unit 152. In another embodiment, a display unit could be comprised of the HUD unit 154. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating taxi information presentable to a pilot of an aircraft, such system comprising:
a source of taxi information data;
at least one source of navigation reference data;
a processor configured to:
   receive aircraft taxi information data representative of at least
      the current position of the aircraft, and
      a designated surface route comprised of at least one specified airport surface;
   retrieve navigation reference data corresponding to the aircraft taxi information data and representative of at least one specified airport surface;
   generate an image data set as a function of the aircraft taxi information data and the navigation reference data, where
      the image data set is representative of an image in which at least one first location highlighter highlights the location of at least one raised surface feature corresponding to a surface feature of one specified airport surface, where
         one first location highlighter corresponds to an actual, visible surface centerline and is comprised of a proximal end and a distal end, where
            the proximal end of the one first location highlighter is located above and not in contact with the actual, visible surface centerline, where
            the one first location highlighter stretches proportionally with an amount of drift of the aircraft from the actual, visible surface centerline,
            the distal end of the one first location highlighter is located perpendicularly above and not in contact with the actual, visible surface centerline, and
            the one first location highlighter snaps at a predetermined distance between the aircraft and the actual, visible surface centerline; and
   provide the image data set to a display system; and
the display system configured to:
   receive the image data set; and
   present the image represented in the image data set.

2. The system of claim 1, wherein the navigation reference data includes data representative of
   locations of corner points of at least one specified airport surface, or
   locations of midpoints of two opposing ends plus surface width information of at least one specified airport surface.

3. The system of claim 1, wherein
   one surface feature is comprised of one surface boundary, and
   one raised surface feature is comprised of one raised surface boundary located perpendicularly above one corresponding surface boundary.

4. The system of claim 1, wherein the navigation reference data includes data representative of locations of midpoints of two opposing ends of at least one specified airport surface.

5. The system of claim 1, wherein the navigation reference data includes data representative of
   at least one raised surface feature, or
   at least one raised surface transition feature.

6. The system of claim 1, wherein
   the image further includes at least one second location highlighter highlighting the location of at least one raised surface transition feature corresponding to a plurality of specified airport surfaces, where
      each second location highlighter is located above and not in contact with its corresponding plurality of specified airport surfaces.

7. The system of claim 6, wherein
   one raised surface transition feature is comprised of one raised transition boundary located perpendicularly above one corresponding surface transition boundary, or
   one raised surface transition feature is comprised of one raised transition centerline centered above and not in contact with one corresponding surface transition centerline.

8. A device for generating taxi information presentable to a pilot of an aircraft, such device comprising:
a processor configured to:
   receive aircraft taxi information data representative of at least
      the current position of the aircraft, and
      a designated surface route comprised of at least one specified airport surface;
   retrieve navigation reference data corresponding to the aircraft taxi information data and representative of at least one specified airport surface;
   generate an image data set as a function of the aircraft taxi information data and the navigation reference data, where
      the image data set is representative of an image in which at least one first location highlighter highlights the location of at least one raised surface feature corresponding to a surface feature of one specified airport surface, where
         one first location highlighter corresponds to an actual, visible surface centerline and is comprised of a proximal end and a distal end where
            the proximal end of the one first location highlighter is located above and not in contact with the actual, visible surface centerline, where
            the one first location highlighter stretches proportionally with an amount of drift of the aircraft from the actual, visible surface centerline,
            the distal end of the one first location highlighter is located perpendicularly above and not in contact with the actual, visible surface centerline, and
            the one first location highlighter snaps at a predetermined distance between the aircraft and the actual, visible surface centerline; and
   provide the image data set to a display system.

9. The device of claim 8, wherein the navigation reference data includes data representative of
   locations of corner points of at least one specified airport surface, or
   locations of midpoints of two opposing ends plus surface width information of at least one specified airport surface.

10. The device of claim 8, wherein
   one surface feature is comprised of one surface boundary, and
   one raised surface feature is comprised of one raised surface boundary located perpendicularly above one corresponding surface boundary.

11. The device of claim 8, wherein the navigation reference data includes data representative of locations of midpoints of two opposing ends of at least one specified airport surface.

12. The device of claim 8, wherein the navigation reference data includes data representative of
   at least one raised surface feature, or
   at least one raised surface transition feature.

13. The device of claim 8, wherein
   the image further includes at least one second location highlighter highlighting the location of at least one raised surface transition feature corresponding to a plurality of specified airport surfaces, where
      each second location highlighter is located above and not in contact with its corresponding plurality of specified airport surfaces.

14. The device of claim 13, wherein
   one raised surface transition feature is comprised of one raised transition boundary located perpendicularly above one corresponding surface transition boundary, or
   one raised surface transition feature is comprised of one raised transition centerline centered above and not in contact with one corresponding surface transition centerline.

15. A method for generating taxi information presentable to a pilot of an aircraft, such method comprising:
   receiving aircraft taxi information data representative of at least
      the current position of the aircraft, and
      a designated surface route comprised of at least one specified airport surface;
   retrieving navigation reference data corresponding to the aircraft taxi information data and representative of at least one specified airport surface;
   generating an image data set as a function of the aircraft taxi information data and the navigation reference data, where
      the image data set is representative of an image in which at least one first location highlighter highlights the location of at least one raised surface feature corresponding to a surface feature of one specified airport surface, where
         one first location highlighter corresponds to an actual, visible surface centerline and is comprised of a proximal end and a distal end, where
            the proximal end of the one first location highlighter is located above and not in contact with the actual, visible surface centerline, where
            the one first location highlighter stretches proportionally with an amount of drift of the aircraft from the actual, visible surface centerline,
            the distal end of the one first location highlighter is located perpendicularly above and not in contact with the actual, visible surface centerline, and
            the one first location highlighter snaps at a predetermined distance between the aircraft and the actual, visible surface centerline; and
   providing the image data set to a display system.

16. The method of claim 15, wherein the navigation reference data includes data representative of
   locations of corner points of at least one specified airport surface, or
   locations of midpoints of two opposing ends plus surface width information of at least one specified airport surface.

17. The method of claim 15, wherein
   one surface feature is comprised of one surface boundary, and
   one raised surface feature is comprised of one raised surface boundary located perpendicularly above one corresponding surface boundary.

18. The method of claim 15, wherein the navigation reference data includes data representative of locations of midpoints of two opposing ends of at least one specified airport surface.

19. The method of claim 15, wherein the navigation reference data includes data representative of
   at least one raised surface feature, or
   at least one raised surface transition feature.

20. The method of claim 15, wherein
   the image further includes at least one second location highlighter highlighting the location of at least one raised surface transition feature corresponding to a plurality of specified airport surfaces, where
      each second location highlighter is located above and not in contact with its corresponding plurality of specified airport surfaces.

21. The method of claim 20, wherein
   one raised surface transition feature is comprised of one raised transition boundary located perpendicularly above one corresponding surface transition boundary, or
   one raised surface transition feature is comprised of one raised transition centerline centered above and not in contact with one corresponding surface transition centerline.

\* \* \* \* \*